(12) United States Patent
Jackson

(10) Patent No.: US 7,199,842 B2
(45) Date of Patent: Apr. 3, 2007

(54) TELEVISION SYSTEM

(75) Inventor: Paul Jackson, Sowerby Bridge (GB)

(73) Assignee: Pace Micro Technology Plc, Saltaire, Shipley (GB)

( * ) Notice: Subject to any disclaimer, the term of this patent is extended or adjusted under 35 U.S.C. 154(b) by 436 days.

(21) Appl. No.: 10/090,298

(22) Filed: Mar. 4, 2002

(65) Prior Publication Data

US 2002/0133819 A1    Sep. 19, 2002

(30) Foreign Application Priority Data

Mar. 14, 2001  (GB) ................................. 0106217.3

(51) Int. Cl.
 *H04N 5/00* (2006.01)
(52) U.S. Cl. ....................................... 348/725; 725/34

(58) Field of Classification Search ........ 348/564–570;
725/38–55
See application file for complete search history.

(56) References Cited

U.S. PATENT DOCUMENTS 6,317,882 B1 * 11/2001 Robbins ....................... 725/34
6,501,514 B1 * 12/2002 Townsend et al. .......... 348/734

\* cited by examiner

*Primary Examiner*—Paulos Natnael
(74) *Attorney, Agent, or Firm*—Head, Johnson & Kachigian

(57) ABSTRACT

The invention relates to the provision of data to a viewer of a television system. In particular the information is provided in a visual and/or audible indication to the viewer of a selected program as to when the next program in that program series is scheduled to be shown. The identity and schedule data is retrieved from data received relating to the generation of an EPG or alternatively from the data broadcast along with the selected program being viewed.

18 Claims, 1 Drawing Sheet

TELEVISION SYSTEM

CROSS-REFERENCE TO RELATED APPLICATION

This application claims priority to British Patent Application No. 0106217.3 filed 14 Mar. 2001.

BACKGROUND OF THE INVENTION

This invention relates to a television system including at least a display screen provided with, or connected to, a broadcast data receiver. The broadcast data receiver (BDR) receives and processes video, audio and/or auxiliary data generated by a broadcaster from a remote location, to a plurality of said BDR's.

Conventionally, at least some of the video data processed by the BDR relates to television or radio programs being shown on particular channels. An electronic or interactive program guide (EPG) display is selectively generated on the display screen using auxiliary data processed by the BDR. The EPG provides program schedules and listings for a particular period of time for the available channels. EPGs are becoming increasingly useful in place of conventional newspaper or magazine based television listings as the number of available channels on digital television increases and thus the number of programs available for viewing also increases.

In use, when a viewer is watching a particular program which is one of a larger series of related programs, the viewer may wish to know when the next episode of the program is due to be shown. However, even though the EPG display is available, as a result of the large number of programs available for selection for viewing, even if the viewer uses the EPG to look for the time of the next episode in the series, it typically takes the viewer some time to identify the next episode.

In addition, the same program is often repeated a number of times and it is again time consuming for the viewer to look through the EPG or other TV listings to identify which of the next showings of their selected program are repeats of previous episode that they have already watched and which are the showings of the next episode of the program series that they have just watched. Thus the viewer may end up watching a repeat of an earlier episode, miss the next episode and/or the like. In some cases the television presenter may announce at the end of the program when the next episode of the program is to be shown but in many cases this does not occur. Furthermore, if the program a viewer has just watched is a repeat of an earlier showing, the announcement at the end of the program may be pre-recorded and therefore out of date.

It is therefore an aim of the present invention to provide a means of allowing a user to quickly and easily determine when the showing of the next episode of a program is scheduled and/or the channel location of the same.

SUMMARY OF THE INVENTION

According to a first aspect of the present invention there is provided a television system including a broadcast data receiver (BDR) for receiving broadcast digital data in the form of audio, video and/or auxiliary data from a remote broadcaster and processing said data to allow video and text to be viewed on a display screen connected to the BDR, said video and text including details of programs available for selection by a viewer and characterised in that when a program which is selected for viewing is part of a series of programs, at a predetermined time point during or at the end of the selected program, an indication is generated by the BDR to inform the viewer of details the scheduled display of next episode of the said series of programs.

Preferably the indication of when the next episode is being shown is based on information provided in an electronic program guide (EPG) display on the display screen.

In one embodiment the indication is generated when the BDR detects the end of the selected program and, the BDR searches or has already searched through EPG data in the BDR and identifies the scheduled showing of next episode of the program series. The BDR then generates the indication, to indicate, typically in text, but also possibly audibly, to the viewer the time, date and channel location for the viewing of the next program in the series.

In an alternative embodiment, data relating to the scheduled showing of the next episode of the program series is broadcast by the broadcaster in conjunction with the data stream for the selected program whereupon an indication is generated at the end of the program by the BDR in response to the received data.

The EPG is typically generated from auxiliary data broadcast from a broadcaster.

Preferably the indication can include any or any combination of the date when the next episode is to be shown, the time at which the next episode is to be shown, the channel on which the next episode is to be shown, a description of the content of the next episode and/or the like.

If the next episode is to be repeated a number of times over a time period, the indication can include details of all showings of the next episode, the earliest showing of the next episode and/or the like.

Preferably the indication includes details of the showing of the next episode of the program which does not overlap with any other bookmarked programs previously selected by the viewer and stored in the EPG.

In one embodiment the indication is in the form of a message displayed on the display screen, and overlaid on the video data displayed at that time.

Further preferably the message is provided on a semi-transparent background at an edge of the display screen to prevent obstruction of the video being shown on the display screen.

Preferably, on display of the message on the display screen, the viewer has the option of hiding the message by using an appropriate control key on control means provided.

In an alternative embodiment the indication is in the form of an audio message generated automatically by the BDR via speakers connected thereto and, from information based on EPG data.

Preferably once the viewer has listened to or has viewed the indication, the viewer can set a reminder so that the BDR informs them when the next episode is to be shown at a time nearer the scheduled showing of the next episode. This is typically performed by depression of one or more keys on control means, such as a remote control device for use with the television system.

Further preferably a user can recall the message providing details of the next episode prior to the scheduled showing of the episode by depression of a pre-selected key on the control means.

Preferably the indication which is generated is displayed for a period of time determined by the user and/or broadcaster.

Preferably the user is provided with an option of switching the next episode indication service on or off.

In one embodiment the indication also includes information relating to when a repeat of the program just viewed is to be shown.

According to a second aspect of the present invention there is provided a method of indicating to a viewer when the scheduled showing of the next episode or episodes in a series of television programs is/are to occur on a television system, said television system including a BDR for receiving broadcast digital data in the form of audio, video and/or auxiliary data from a remote broadcaster and processing said data for viewing on a display screen and/or listening via speakers connected to the BDR, characterised in that said method includes the steps of the BDR identifying whether a series of programs exist for a program selected for viewing on the system, the BDR searching received schedule data for the next episode in the selected program series and, if an episode is identified the BDR then generates an indication to inform the viewer of when the next episode of the program is to be shown.

The present invention has the advantage that the user can quickly and easily determine when the next episode of a particular program series is to be shown, without having to manually look through television schedules/listings to obtain the information.

BRIEF DESCRIPTION OF THE DRAWINGS

An embodiment of the present invention will now be described with reference to the following figure.

DESCRIPTION OF THE PREFERRED EMBODIMENTS

Figure 1:
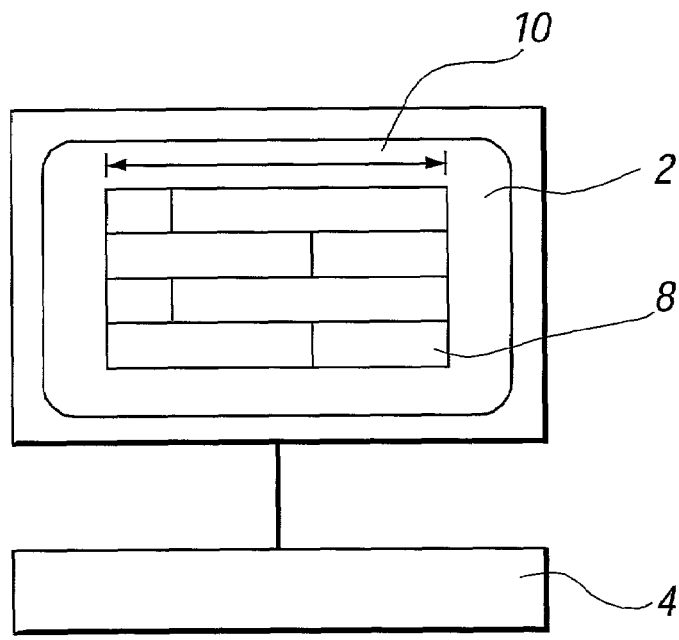
FIG. 1 is an example of a television system according to an embodiment of the present invention.

Referring to FIG. 1, there is illustrated a television system including a display screen 2 connected to a broadcast data receiver 4. The television system has an electronic program guide (EPG) 8 which displays television program listings and/or schedules for a particular time period, 10.

Figure 2:
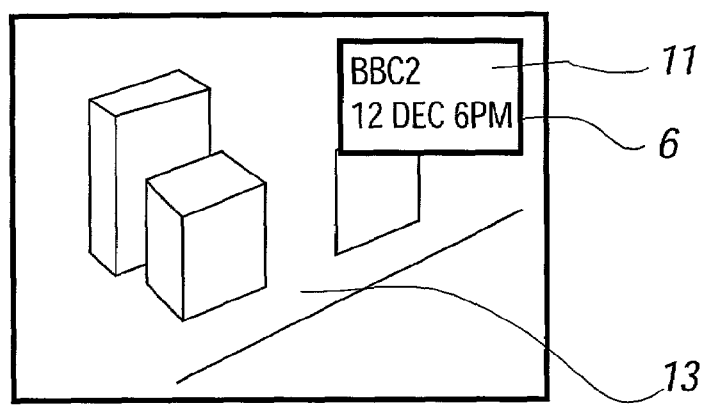
FIG. 2 illustrates the television system in use in accordance with the invention.

In accordance with the invention, if a viewer is watching a program which is part of a television program series of related programs, a display 6 as shown in FIG. 2, is generated by the BDR. The display contains a message on the display screen at the end of the selected program being viewed, informing the viewer of the date and time of when the next episode of the series is to be shown and the channel on which the next program is to be shown.

In addition, a brief description of what is being shown in the next episode of the program can also be provided in the display.

The display, in this embodiment, is semi-transparent and appears at the edge of display screen 2 so that it does not obstruct the viewer's vision of the video being shown on the display screen. However, the viewer can change the position of the window 6 if required.

The window typically appears on the display screen for a short period of time, such as 10 seconds.

The viewer can hide the indication if required or select an option from an options menu in the EPG to switch the indication off. Typically the viewer can also select the details provided in the reminder message using the options menu. For example, the viewer can choose whether to be provided with a brief description of what the next episode is about. This allows the viewer to decide whether to set a reminder to be informed nearer the time of the next episode that the program is about to start or has started.

The viewer typically uses a remote control device to select options such as, to hide the indication display; set a reminder in the EPG to be informed of the next showing of the episode and/or display details of the times, channels and dates of all the showings of the next program episode.

Figure 3:
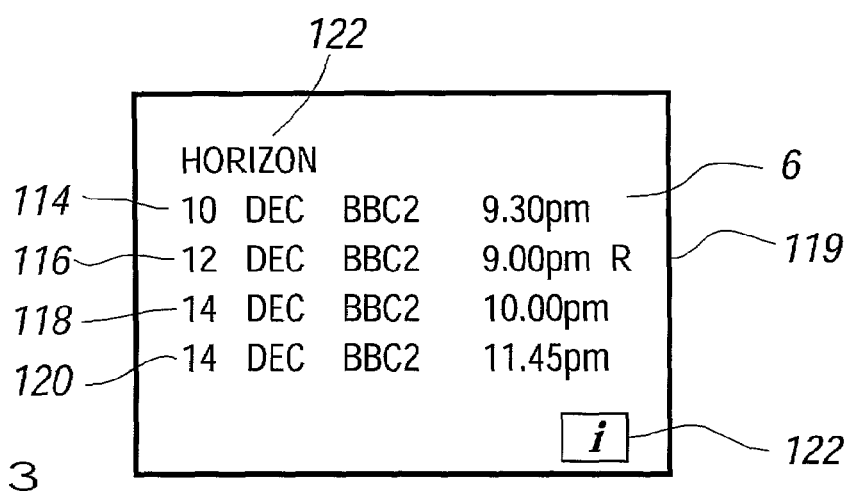
FIG. 3 illustrates one display generated in accordance with the invention.

In a practical example, if a viewer is watching a selected program titled "Horizon" on BBC Knowledge, then towards the end of the program the BDR searches through received program schedule data. In one embodiment the received data for the selected program indicates that it is part of a series and when the next program is scheduled to be shown. From that data the BDR can display a message as described. Alternatively the BDR can identify the selected program and search through the received EPG data to identify the same program title and when it is next due to be viewed. In either embodiment, if there is a further program in the same program series as the selected program "Horizon", a display 106 is displayed on the screen to inform the user of when that next episode of the Horizon program series is to be shown as illustrated in FIG. 3. The message indicates that the next episode 112 is to be shown four times 114, 116, 118, 120 every day for the next week. The user then selects a reminder for one of the showings 116 so that they are informed of when the selected showing is due to start.

Thus the present invention allows the user to more easily plan their viewing for a particular time period without having to consult other television listings/schedules. The user can then use other features of the EPG or television system to set reminders, add the episode to a favourites schedule and/or the like.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. A television system, said system comprising:
   a display screen;
   a broadcast data receiver connected to said display screen for receiving broadcast digital data in the form or audio, video and/or auxiliary data from a remote broadcaster and for processing said data to allow video and/or text to be selectively viewed on said display screen, said video and tart which can be selected, including details of programs available for selection by a viewer;
   means to select a program for viewing which is a part of program; and
   at a pre-determined time point during or at the end of the selected program being viewed, an indication is generated by the broadcast data receiver to inform the viewer of the details of the scheduled broadcast of the next episode of said series of programs and is in the form of information provided in a text display in said display screen and wherein said indication is generated with respect to the program being viewing at the time.

2. A television system according to claim 1 wherein said indication is generated when said broadcast data receiver detects the end of the selected program and said broadcast data receiver searches, or has already searched, through an electronic program guide data in said broadcast data receiver to identify the scheduled showing of the next episode of the program series.

3. A television system according to claim 1 wherein said data relating to the scheduled showing of the next episode of the program series is broadcast by said remote broadcaster in conjunction with the data for the selected program where upon an indication is generated in response to the received data.

4. A television system according to claim 1 wherein said indication is typically generated from auxiliary data broadcast from a broadcaster and used for the generation of an electronic program guide.

5. A television system according to claim 1 wherein said indication may include any from the group consisting of the date when the next episode is to be shown, the time at which the next episode is to be shown, the channel on which the next episode is to be shown, and a description of the content or the next episode.

6. A television system according to claim 1 wherein when the next episode is to be repeated a number of times over a time period, said indication includes details of all showings of the next episode, in that period.

7. A television system according to claim 1 wherein said indication includes details of the showing of the next episode of the program which does not overlap with any other bookmarked program previously selected by the viewer.

8. A television system according to claim 1 wherein said indication is in the form of a text message displayed on said display screen, and overlaid on video data displayed at that time.

9. A television system according to claim 8 wherein said displayed text is provided on a semi-transparent background.

10. A television system according to claim 1, wherein during display of said indication on said display screen, the viewer has an option of hiding said indication by using an appropriate control key on control means provided.

11. A television system according to claim 1 wherein said indication is in the form of an audio message generated by said broadcast data receiver via speakers connected thereto.

12. A television system according to claim 1 wherein the viewer can set a reminder function so that said broadcast data receiver informs them when the next episode is to be shown at a time near the scheduled showing of the next episode.

13. A television system according to claim 1 wherein the viewer can recall said indication prior to the scheduled showing of the episode by depression of a pre-selected key on control means for said television system.

14. A television system according to claim wherein said indication which is generated is displayed for a period of time determined by the user and/or broadcaster.

15. A television system according to claim 1 wherein said indication includes information relating to when a repeat of the selected program is to be shown.

16. A method of indicating to a viewer of a television program when a scheduled showing of the next episode or episodes in a series of television programs is/are to occur on a television system including a broadcast data receiver for receiving broadcast digital data in the form of audio, video and/or auxiliary data from a remote broadcaster and processing said data for viewing on a display screen and/or listening via speakers connected to the broadcast data receiver, said method includes the steps of;

the broadcast data receiver identifying whether a series of programs exist for a program selected for viewing on said system;

the broadcast data receiver searching received data for the scheduled broadcast of the next episode in the series;

wherein when the selected program is being viewed and said program has been identified as an episode of said series of programs, the broadcast data receiver generates an indication to inform the viewer of when the next episode of said series of programs is to be shown and said indication is generated as text on the display screen.

17. A television system said system comprising;

a display screen;

broadcast digital data in the form of audio video and/or auxiliary data including details of a program which may be one in a series of programs available for selection by a viewer; and a broadcast data receiver for receiving said digital data and for processing said digital data to allow video and/or text to be selectively viewed on said display screen and having indication means for indicating to a viewer at a predetermined time point details of the scheduled display of the next episode in a series of programs and wherein said indication means generate an indication as text on the display screen and said indication is generated upon the identification of the current episode being viewed.

18. A television system, said system comprising;

a display screen;

a broadcast data receiver connected to said display screen for receiving broadcast digital data in the form or audio, video and/or auxiliary data from a remote broadcaster and for processing said data to allow video and/or text to be selectively viewed on said display screen, said video and text which can be selected, including details of programs available for selection by a viewer; and when a program which is selected for viewing is part of a series of programs, said broadcast data receiver detects the identity of the selected program and searches through said auxiliary data in said broadcast data receiver to identify the scheduled showing of the next episode of the program series and generates an indication to inform the viewer of the details of the scheduled display of the next episode of the series of programs and displays the information provided in a text display screen.

* * * * *